United States Patent

[11] 3,633,382

[72] Inventor Kenneth L. Westercamp
 Saginaw, Mich.
[21] Appl. No. 738,333
[22] Filed June 19, 1968
[45] Patented Jan. 11, 1972
[73] Assignee General Motors Corporation
 Detroit, Mich.
 Continuation of application Ser. No. 559,302, June 21, 1966, now abandoned. This application June 19, 1968, Ser. No. 738,333

[54] UNIVERSAL JOINT
 8 Claims, 3 Drawing Figs.
[52] U.S. Cl................................................. 64/21
[51] Int. Cl................................................. F16d 3/30
[50] Field of Search................................... 64/21

[56] References Cited
UNITED STATES PATENTS
3,370,441 2/1968 Aucktor .................. 64/21

Primary Examiner—Benjamin W. Wyche
Assistant Examiner—Randall Heald
Attorneys—E. W. Christen, A. M. Heiter and R. L. Phillips ABSTRACT: A constant velocity universal joint includes an outer member having a cylindrical inner surface, an inner member having a spherical outer surface, a spherical cage embracing the inner member, a plurality of alternated cross grooves formed in the inner and outer members, and a plurality of torque transmitting balls confined within the grooves. The spherical mating of the cage with the inner member locks the balls and thus the joint against axial movement, while permitting angulation of the joint.

INVENTOR.
Kenneth L. Westercamp
BY
Herbert Furman
ATTORNEY

UNIVERSAL JOINT

This is a continuation of Ser. No. 559,302, filed June 21, 1966, and now abandoned.

This invention relates generally to universal joints and more specifically to a constant velocity crossed groove universal joint having a fixed center of rotation.

Early ball-in-groove universal joints having fixed centers of rotation utilized ball and socket joint members having an interposed cage. The joint members were provided with axially straight meridian grooves which cooperated with the cage to obtain constant velocity and a fixed center or rotation. Further developments provided the ball and socket members with helical crossed grooves wherein one member had a plurality of right-hand helical grooves while the other member had left-hand helical grooves to permit greater angulation. All of these joints suffered the common faults of being structurally complex and having large areas of frictional contact between the joint elements which produce a great amount of heat that shortens joint life and limits effectiveness.

Later, universal joints were developed which were capable of axial slip. These joints included a cylindrical outer member and a spherical inner member provided with crossed helical grooves, plus a cage spherically mounted to the inner member. Such joints produced less friction-generated heat and were subject to sliding axial displacement upon application of axial forces.

Recently "slip joints" have been developed wherein both members have cylindrical configurations and include crossed helical grooves, with alternate grooves in each member having opposite hand helices. Such joints employ a floating cage to permit true rolling slip and generate relatively little frictional heat. However, these slip joints are unsuitable for many applications where axial slip is undesirable.

Heretofore no universal joint has been developed which has a fixed center of rotation and yet produces a very small amount of friction-generated heat.

It is therefore the primary feature of this invention to provide a fixed center ball-in-groove universal joint having a simplified structure and having minimal friction contact between the cage and the joint members, thereby greatly reducing friction-generated heat. Another feature is that alternate crossed grooves are provided in a cylindrical outer member and a spherical inner member and the balls are positioned in a single torque-transferring plane by a spherical cage mounted to the inner member. Yet another feature is that the fixed center of rotation is obtained by cooperation of the balls, the grooves and the cage which preclude any axial slip of the joint members. Still another feature is that the spherical cage axially locks the balls to the inner member and cooperates with the grooves to preclude any axial slip.

Further features of this invention will become readily apparent upon reference to the following detailed description of the accompanying drawings in which.

Figure 1:
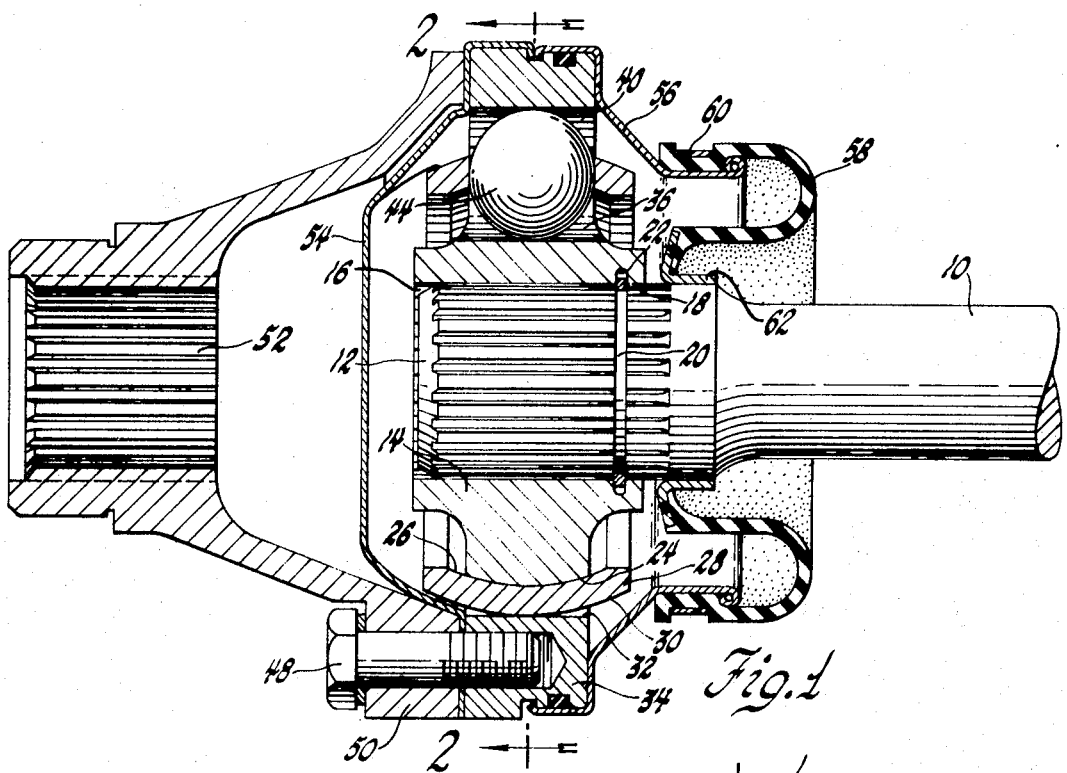
FIG. 1 is a sectional view of a universal joint according to this invention taken generally along the plane indicated by line 1—1 of FIG. 2.

Referring now to FIG. 1 of the drawings, a shaft 10 has an enlarged end 12 which is conventionally secured to a universal joint inner member 14 by a spline connection 16. Member 14 is axially retained on shaft 10 by a split retaining ring 18 received within respective grooves 20 and 22 formed in shaft 10 and inner member 14. Member 14 has a spherical outer surface 24 which is embraced by the inner surface 26 of a spherical cage member 28, thus locking the cage to the inner member. The outer surface 30 of cage 28 is in line contact with, or spaced slightly from, the cylindrical inner bore 32 of a universal joint outer member 34.

Figure 3:
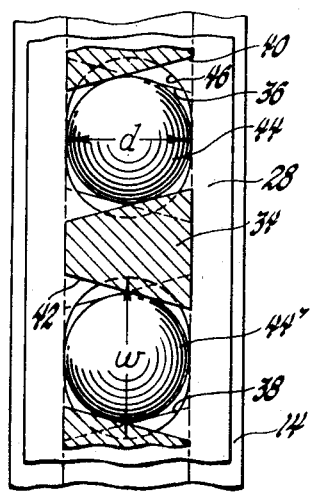
FIG. 3 is a sectional view taken generally on the plane indicated by line 3—3 of FIG. 2.
Figure 2:
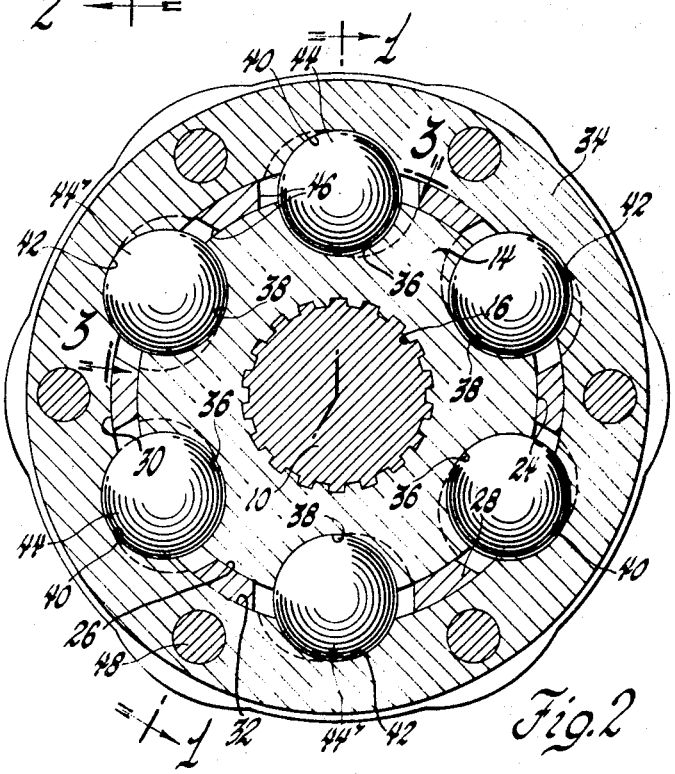
FIG. 2 is a sectional view taken generally on the plane indicated by line 2—2 of FIG. 1.

Referring now to FIG. 2, inner member 14 is provided with six circumferentially equally spaced helical grooves including a first set of three right-hand grooves 36 and a second set of three left-hand grooves 38 which are alternated with grooves 36. Similarly, outer member 34 is provided with six circumferentially equally spaced helical grooves including a third set of three left-hand grooves 40 and a fourth set of three right-hand grooves 42 which are alternated with grooves 40. Each groove 40 corresponds to one of the grooves 36 and is crossed with respect thereto. Each groove 42 corresponds to and is crossed with respect to one of the grooves 38. Thus grooves 36, 40 and 38, 42 form alternate pairs of corresponding crossed grooves. The axes of all the grooves 36, 38, 40 and 42 are equally angled in relation to the respective axes of the inner and outer members 14 and 34, as shown in FIG. 3. The axes of these grooves may be straight, but are preferably helical, i.e., having a constant radial distance from the axis of the respective member.

A plurality of torque transmitting balls 44 and 44' interconnect the inner and outer members and are confined at the intersection of the corresponding crossed groove pairs 36, 40 and 38, 42. Upon application of torque to member 14, grooves 36 and 38 transmit equal but opposite axial forces through alternate balls 44 and 44' to member 34 via grooves 40 and 42. Since there are an equal number of oppositely equally angled grooves in each member, the axial forces will cancel out and no resultant axial thrust will be produced in the joint.

Cage 28 is provided with a plurality of circumferentially aligned ball apertures 46 for retaining the balls 44 and 44'. Each aperture 46 has an axial dimension $d$ substantially equal to the ball diameter and a larger lateral dimension $w$.

As is well known in the art, upon angulation of the joint, the crossed grooves position balls 44 and 44' in the homokinetic plane, i.e., the plane bisecting the included angle between the members, to produce constant velocity. Since the grooves are angled with respect to the member axes, angulation produced both lateral and axial rolling movement of the balls relative to members 14 and 34. As cage 28 rotates on member 14, the restrictive aperture dimension $d$ maintains a coplanar relationship of the balls and prevents the escape of a ball upon alignment of any corresponding groove pairs. Dimension $w$ is large enough to permit lateral travel of the balls during angulation of the joint.

FIG. 3 illustrates the means for preventing relative axial movement of "slip" between members 14 and 34 to provide a fixed center of joint rotation. Pure axial slip of inner member 14 relative to outer member 34 would require rolling movement of balls 44 relative to both members. Thus ball 44 would be forced to roll to a new position in both grooves 40 and 36, as would ball 44' in grooves 42 and 38. Since the balls are axially locked to cage 28, the cage would also have to move relative to the members. However, as shown in FIG. 1, the mating spherical surfaces 26 and 24 render relative axial movement between cage 28 and member 14 impossible. Thus balls 44 and 44' are prevented from rolling to produce axial slip.

Even though rolling axial slip is prevented, skidding slip, i.e., movement of the balls in grooves 40 and 42 without rolling, would be possible if members 14 and 34 were relatively rotatable. Such rotation would skid race 40 axially and laterally relative to ball 44, which would remain locked in position in groove 36. Thus member 34 could "unscrew" leftwardly from member 14, cage 28 and ball 44 by moving downwardly in FIG. 3. However, member 14 would have to rotate in a different direction i.e., upwardly, to move groove 42 leftwardly of its ball 44'. Since member 34 cannot rotate simultaneously in both directions, the opposing wedging action of the adjacent oppositely crossed grooves 40 and 42 prevents rotation and axial separation of members 14 and 34. Thus it is readily seen that any axial slip between inner member 14 and outer member 34 is precluded by providing alternate pairs of oppositely crossed grooves, confining the balls axially to the cage, and fixing the cage axially to the inner member.

Since the center or rotation is fixed by cooperation of the alternately crossed grooves, the balls and the cage, no ball and socket connection is needed. Thus manufacture is less costly since close tolerances required to mate a spherical outer member to the cage and the inner member are eliminated. Assembly is simplified through elimination of a two-part spherical outer member. This construction substantially reduces the total area of frictional contact as compared to a conventional ball and socket connection between the joint members. As shown in FIG. 1, cage 28 and inner member 14 have relatively small circumferential area of contact, while the outer member is in line contact with, or is slightly spaced from, the cage. Thus a substantial reduction in heat generated by frictional contact between the joint members and the cage is effected.

Member 34 is bolted at 48 to a coupling member 50 which is provided with a splined bore 52 for attachment to a shaft. An inner lubricant seal 54 and an outer shield 56 are attached to member 34 by staking. A conventional rubber boot 58 is clamped by a band 60 to shield 56. A retainer 62 secures boot 58 to shaft 10.

In the preferred embodiment shown, each joint member is provided with two sets of three grooves each. However any equal number of equally angled left- and right-hand grooves may be used.

While only a preferred embodiment of this invention is shown and described, modifications thereof are contemplated within the scope of this invention.

I claim:

1. A universal joint, comprising an outer member having a cylindrical inner surface, an inner member having a spherical outer surface, a first set of grooves formed in the inner member and having their axes crossed with respect to the inner member axis, a second set of grooves formed in the inner member and having their axes crossed with respect to the inner member axis in a circumferential direction opposite that of the first set of grooves, a third set of grooves formed in the outer member and having their axes crossed with respect to the outer member axis, each third set groove being crossed with respect to a corresponding first set groove, a fourth set of grooves formed in the outer member and having their axes crossed with respect to the outer member axis in a circumferential direction opposite that of the third set of grooves, each fourth set groove being crossed with respect to a corresponding second set groove, a plurality of torque transferring means carried by pairs of the corresponding crossed grooves at the groove intersections, and spherical cage means embracing the inner member outer surface and positioning the torque transmitting means in a single torque transmitting plane, the cage means thereby axially locking the cage means to the inner member and restraining the torque transmitting means against axial movement relative to the cage means to preclude relative axial movement between the inner and outer members.

2. The universal joint recited in claim 1, wherein the first and second sets of grooves are formed in the inner member in alternate circumferential sequence and the third and fourth sets of grooves are formed in the outer member in alternate circumferential sequence.

3. The universal joint recited in claim 2, wherein the angles formed by the crossing of the groove axes with the respective member axes are equal.

4. The universal joint recited in claim 1, wherein the grooves are helical.

5. The universal joint recited in claim 1, wherein the torque transferring members are balls and the cage means includes an aperture for each ball, each aperture having an axial dimension approximately equal to the ball diameter to preclude relative axial movement between the balls and the cage means.

6. The universal joint recited in claim 3, wherein each of the first, second, third and fourth sets of grooves comprise three grooves.

7. A constant velocity nontelescopic joint comprising: an inner and an outer joint element, longitudinal grooves in said inner and outer joint elements, balls guided and longitudinally displaceable in said grooves for transmitting torque between said joint elements, the longitudinal center lines of said grooves crossing one another in pairs with alternate opposite inclination, cage means disposed between said joint elements for retaining said balls in coplanar fashion in said grooves and in apertures in said cage means, said cage means and said joint elements being longitudinally nondisplaceably guided and angularly displaceable with respect to each other, said cage means being unilaterally centered on one of said joint elements only and disposed with clearance relative to the other joint element, said cage means and said balls in said grooves forming the only means for holding said joint elements longitudinally nondisplaceable with respect to each other.

8. A joint according to claim 7, wherein said cage means is guided and centered on said inner joint element only and wherein the interior of said outer joint element is cylindrical.

* * * * *